United States Patent
Ganong et al.

(10) Patent No.: US 8,201,317 B2
(45) Date of Patent: Jun. 19, 2012

(54) GENERATOR ROTOR WITH IMPROVED HOLLOW SHAFT

(75) Inventors: Scott R. Ganong, Stillman Valley, IL (US); Glenn C. Lemmers, Jr., Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/213,113

(22) Filed: Aug. 19, 2011

(65) Prior Publication Data

US 2011/0296672 A1 Dec. 8, 2011

Related U.S. Application Data

(62) Division of application No. 12/436,161, filed on May 6, 2009, now Pat. No. 8,030,821.

(51) Int. Cl.
*H02K 7/00* (2006.01)
(52) U.S. Cl. ........................... 29/598; 310/261.1
(58) Field of Classification Search ............... 310/68 D, 310/71, 261.1; 29/596–598
See application file for complete search history.

(56) References Cited

U.S. PATENT DOCUMENTS

| | | | |
|---|---|---|---|
| 4,025,960 A * | 5/1977 | Gray et al. | 310/168 |
| 4,289,989 A * | 9/1981 | Schibline | 310/216.123 |
| 4,545,470 A | 10/1985 | Grimm | |
| 4,647,805 A * | 3/1987 | Flygare et al. | 310/61 |
| 4,683,389 A * | 7/1987 | Readman et al. | 310/62 |
| 4,997,072 A | 3/1991 | Lapthorne | |
| 5,023,789 A | 6/1991 | Lampe et al. | |
| 5,029,689 A | 7/1991 | Grimm | |
| 5,119,905 A | 6/1992 | Murray | |
| 5,121,019 A | 6/1992 | Pradler | |
| 5,174,109 A | 12/1992 | Lampe | |
| 5,325,009 A | 6/1994 | Capion et al. | |
| 5,562,190 A | 10/1996 | McArthur | |
| 5,630,704 A | 5/1997 | Gilgenbach et al. | |
| 6,489,702 B1 * | 12/2002 | Bartman | 310/219 |
| 6,897,581 B2 | 5/2005 | Doherty et al. | |
| 7,084,522 B2 | 8/2006 | Wobben | |
| 7,131,275 B2 | 11/2006 | Gustafson | |
| 2009/0227416 A1 | 9/2009 | Kakinami et al. | |

* cited by examiner

*Primary Examiner* — Tran Nguyen
(74) *Attorney, Agent, or Firm* — Carlson, Gaskey & Olds, PC

(57) ABSTRACT

A method of replacing a generator rotor shaft into a generator includes the steps of moving the rotor shaft such that a central portion supports a main winding section of the generator, and such that smaller diameter portions are supported by bearings, and utilizing a wire that extends through slots in the rotor shaft to connect a rectifier assembly to an exciter rotor.

6 Claims, 3 Drawing Sheets

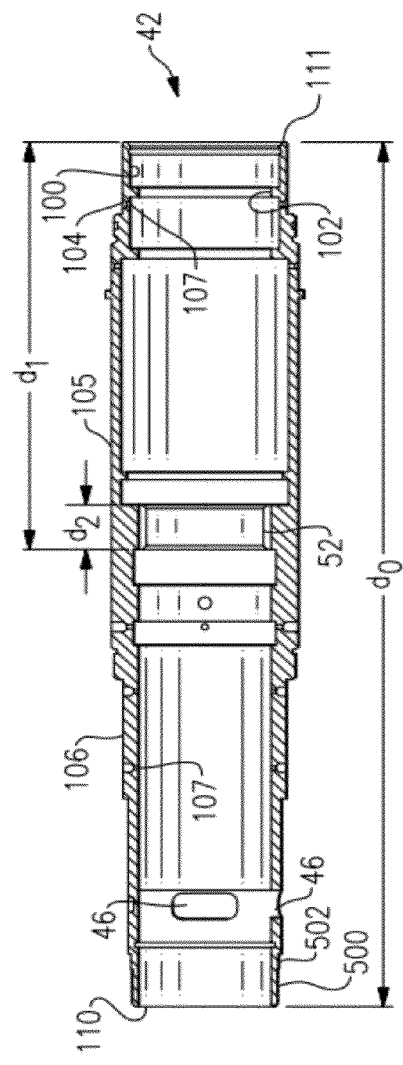
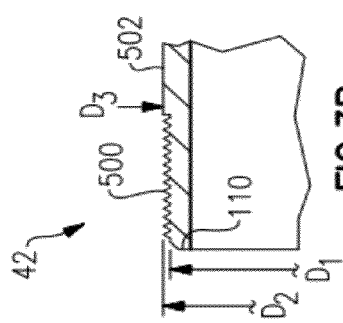
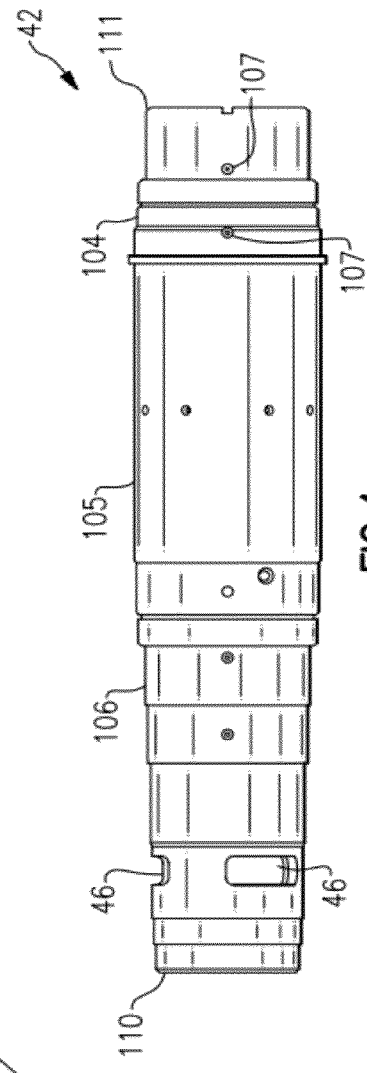

GENERATOR ROTOR WITH IMPROVED HOLLOW SHAFT

RELATED APPLICATION

This application is a divisional application of U.S. application Ser. No. 12/436161, which was filed May 6, 2009 now U.S. Pat. No. 8,030,821.

BACKGROUND OF THE INVENTION

This application relates to a rotor shaft for use in a generator, wherein the rotor shaft is configured to more efficiently utilize space.

Generators are known and typically include main windings that rotate with a rotor shaft. The rotor shaft is selectively driven to in turn drive the main windings adjacent to a stator, and the rotation of the windings relative to the stator generates electricity.

Modern generators have a number of additional accessories. As an example, an exciter rotor and a permanent magnet rotor are also attached to the rotor shaft. In addition, a rectifier assembly may communicate with the exciter rotor. The rectifier assembly has been mounted within a hollow rotor shaft, however, the exciter rotor has typically been at the end of the shaft. A wire can communicate to the rectifier assembly from the exciter by merely extending around the end of the shaft. The requirement of mounting the exciter rotor at this location provides an undesirable design constraint.

In addition, there have been compromises with regard to the size of the shaft. Typically, a clutch member includes splines that selectively transmit rotation to the rotor shaft. The clutch member must be able to slide such that it can be engaged or disengaged from a drive input. The splines have typically been provided at one end of the rotor shaft. Having the spline connection at either a remote end or an adjacent end of the rotor shaft results in a clutch member that is either too long or too short for many design applications.

Furthermore, generators are typically designed such that they will always operate at a frequency that is below a first natural frequency of the overall assembly. To achieve this goal, it is desirable to increase the rotor outer diameter, and to decrease the distance between supporting bearings for the rotor. However, the requirement of including several operational components has made achieving these goals challenging.

SUMMARY OF THE INVENTION

A method of replacing a generator rotor shaft into a generator includes the steps of moving the rotor shaft such that a central portion supports a main winding section of the generator, and such that smaller diameter portions are supported by bearings, and utilizing a wire that extends through slots in the rotor shaft to connect a rectifier assembly to an exciter rotor.

These and other features of the present invention can be best understood from the following specification and drawings, the following of which is a brief description.

BRIEF DESCRIPTION OF THE DRAWINGS

FIG. 3A shows a rotor shaft.
FIG. 3B shows a detail of the FIG. 3A view.
FIG. 4 is an outer view of the rotor shaft.

DETAILED DESCRIPTION OF THE PREFERRED EMBODIMENT

Figure 1:
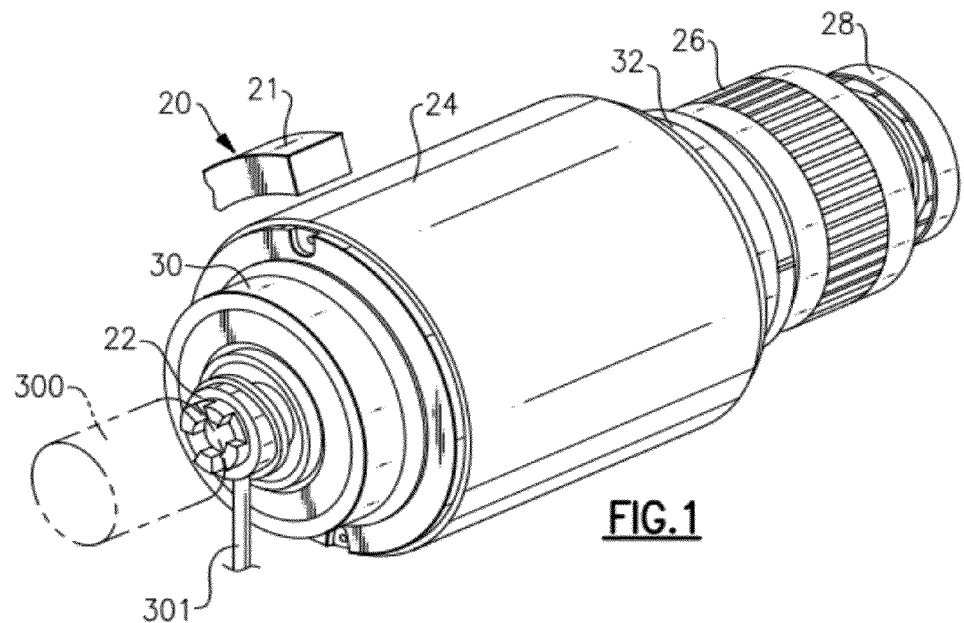
FIG. 1 is a view of a generator.

FIG. 1 shows a generator 20 including a stator 21, shown schematically. A clutch member 22 has teeth that will selectively engage teeth on a drive input 300. The clutch member 22 may also be driven to engage or disengage from the drive input.

Main winding section or core 24 rotates near the stator 20. An exciter rotor 26 and a permanent magnet rotor 28 provide control and safety functions, and also are associated with their own stators (not shown). Bearings 30 and 32 are placed on opposed axial ends of the main winding section 24.

A drive input 300 is shown in phantom in FIG. 1 and a yoke 301 is shown schematically. The yoke 301 operates to cam surfaces on the clutch member 22 toward and away from the drive input 300 such that drive can be selectively transmitted. Aspects of the clutch member, the yoke and the drive input are found in co-pending patent application Ser. No. 12/436159, filed on even date herewith, and entitled "Decoupler Shaft for High Speed Generator" and owned by the assignee of this application and "High Speed Clutch Design with Jaw Tooth Profile to Reduce Separating Load," assigned Ser. No. 12/436168, filed on even date herewith, and assigned to the assignee of the present invention. In addition, a rotor gear which is driven by the rotor shaft is disclosed in co-pending patent application Ser. No. 12/436190, filed on even date herewith, and entitled "Rotor Gear for a Generator." This rotor gear serves to assist in driving an oil pump for delivering oil to components within the generator. In addition, a permanent magnet rotor is attached to the rotor shaft in a manner disclosed below, but further disclosed in detail in a co-pending patent application Ser. No. 12/436164, filed on even date herewith, and entitled "Axial Retention of Permanent Magnet Rotor in High Speed Generator."

Figure 2:
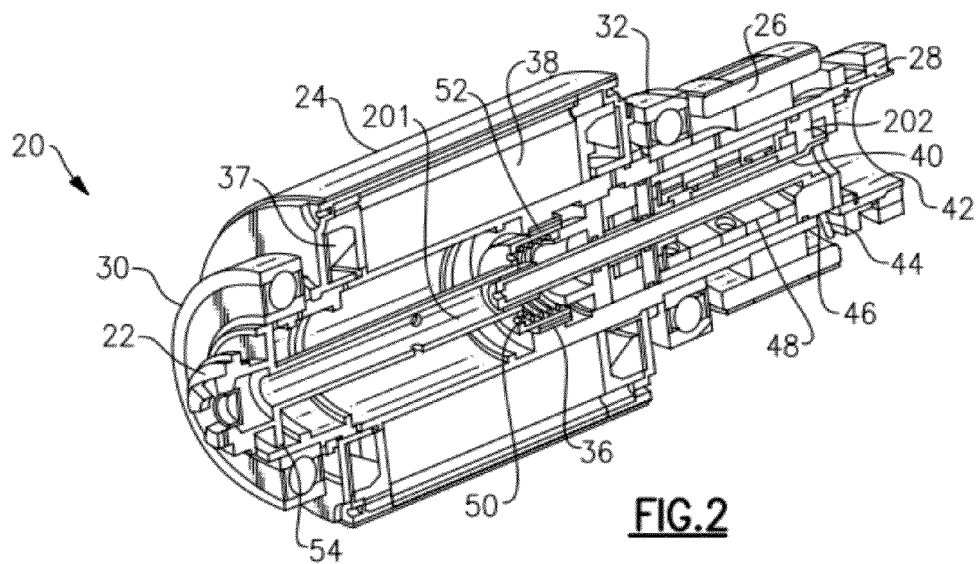
FIG. 2 is a cross-sectional view through the FIG. 1 generator.

FIG. 2 shows bearings 30 and 32 mounted at each end of the main winding section 24. Windings 37 and laminations 38 are received within this main winding section 24.

An enlarged portion 54 of the clutch member 22 is a close fit within an inner diameter of a rotor shaft 42. Spline 52/36 supports the opposite end of the inner diameter shaft. A rectifier assembly 48 is shown schematically, and is positioned within a bore in the rotor shaft 42. An element 40 is an oil distribution transfer tube which provides oil to the disconnect shaft or clutch member 22. The oil may then be distributed to the rotor shaft. As can be seen, the oil tube 40 is received within an inner diameter 201 of the clutch member 22.

Spline teeth 52 are formed at an axially intermediate portion of the inner bore of the shaft 42, and mate with spline teeth 36 on the clutch member 22. A spring 50 biases the clutch member 22 outwardly, and against the input shaft 300.

Generally, a bar is machined by a lathe to include the basic shape of the rotor shaft 42. Teeth 52 are formed at an internal surface by some machining process, and in one embodiment, a broaching operation. The intermediate member is then heat treated and final machined.

A wire 44 communicates from the exciter rotor 26 to the rectifier assembly 48, and extends through slots 46 in the shaft 42.

A method of replacing a generator rotor shaft into a generator includes the steps of moving the rotor shaft 42 such that a central portion 105 supports a main winding section of the generator, and such that smaller diameter portions 104 and 106 are supported by bearings, and moving a wire through slots in the shaft, and utilizing the wire to connect a rectifier assembly to an exciter rotor.

FIG. 3A is a cross-sectional view through the shaft 42. As shown, surfaces 104 and 106 are formed to be at a smaller diameter relative to a central portion 105, which supports the main winding section 24. The bearings 30 and 32 are received on surfaces 104 and 106. Slots 46 are shown to include a plurality of slots, which are circumferentially spaced. As can be seen, a ledge 102 is positioned slightly axially inwardly from the end 111. This ledge will provide a stop for the clutch member 34 when the generator is selectively disengaged.

An end 111 of the shaft, which receives the clutch member 34, is spaced from an opposed end 110 by a first distance d0. The end of each spline 52 is spaced from the end 111 by a second distance d1. The spline 52 extends over a third distance d2.

Lubrication holes 107 are spaced along the rotor shaft 42.

A ratio of d1 to d0 is preferably between 0.3 and 0.6, and more preferably, 0.4 and 0.5. The ratio of d2 to d1 is preferably between 0.1 and 0.125.

A ratio of d0 to d1 is preferably between 0.3 and 0.6, and more preferably, 0.4 and 0.5. The ratio of d1 to d2 is preferably between 0.1 and 0.125.

As can be best seen in FIG. 3B, at end 110, there are screw threads 500, and a piloting diameter 502. As disclosed in the above-referenced U.S. patent application entitled "Axial Retention of Permanent Magnet Rotor in High Speed Generator," the permanent magnet motor has threads which mate with threads 500, and a pilot surface that pilots on surface 502. These portions of the above-referenced application are incorporated herein by reference. As can be appreciated from FIG. 3B, a first diameter D1 to the root of the screw thread teeth is defined, as is a second diameter D2 to the tip of the screw thread teeth. A third diameter D3 is defined to the outer diameter of the pilot surface 502. Although not shown as diameters in FIG. 3B, it should be appreciated that these are diameters. In one embodiment, the diameter D1 is between 1.8730" (47.574 mm) and 1.8798" (47.746 mm). The diameter D2 is between 1.9294" (49.007 mm) and 1.9375" (49.212 mm) and the diameter D3 is between 2.0165" (51.219 mm) and 2.0160" (51.20 mm). In embodiments, a ratio of D3 to D1 is between 1.07 and 1.08.

In one embodiment, the screw threads were 20 threads per inch. A self-locking thread available under the trade name Spiralok was used on the permanent magnet rotor.

As shown in FIG. 4, the slots 46 are circumferentially spaced. The slots preferably extend over more than 180° of the circumference of the shaft 42 at that location. In embodiments, the slots may extend over more than 270°.

Figure 5:
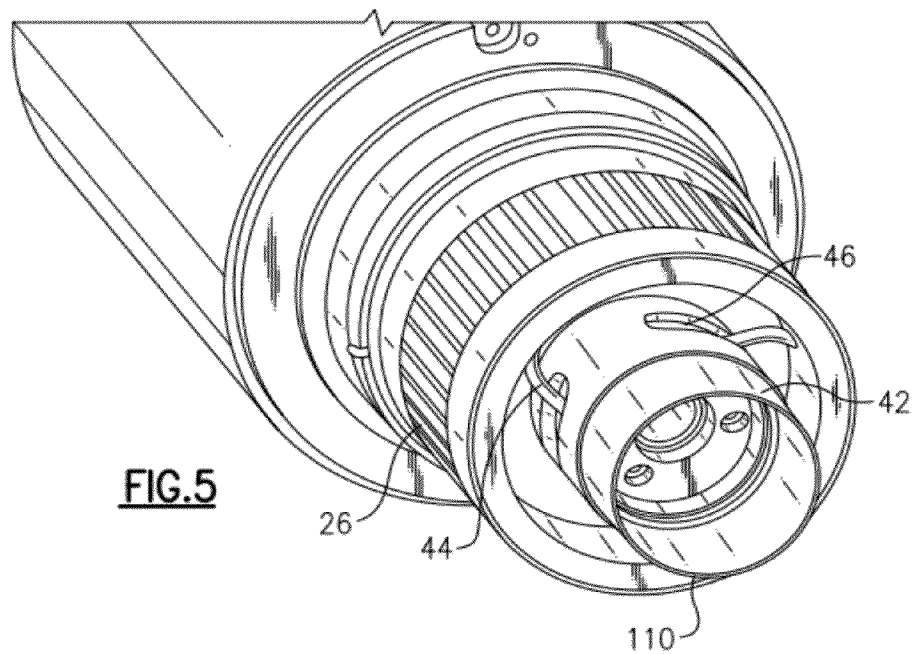
FIG. 5 is an end view of a generator.

FIG. 5 is an end view of the shaft 42 showing the slots 46 and the wires 44 passing into the shaft 42. Note the threads 500 are eliminated from the view for illustration simplicity.

Figure 6:
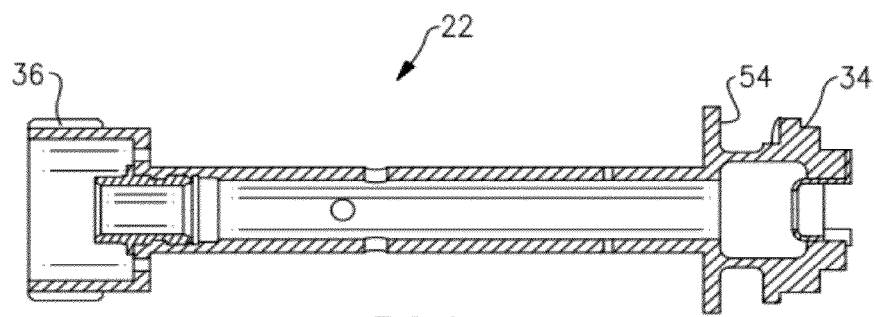
FIG. 6 shows a clutch member incorporated into the generator.

FIG. 6 shows the clutch member 22 having splines 36 at one end, the portion 54 that is to be tightly received within end 111. Teeth at the opposed end selectively engage teeth on the input shaft 300.

The rotor shaft as disclosed and claimed in this application provides several benefits, including providing freedom as to the location of the exciter rotor, and to further allow a disconnect clutch shaft to have a length that is at a more optimal dimension relative to the prior art. In addition, a worker of ordinary skill in the art would appreciate many other benefits from the disclosed application.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of replacing a generator rotor shaft into a generator comprising the steps of:
   moving the rotor shaft such that a central portion supports a main winding section of the generator, and such that smaller diameter portions are supported by bearings;
   utilizing a wire that extends through slots in the rotor shaft to connect a rectifier assembly to an exciter rotor; and
   the rotor shaft having a shaft body extending through a first axial distance, and being hollow with spline teeth formed on an inner bore of said shaft body, a ratio of a distance from one axial end of said shaft body to a remote axial end of said spline teeth, to the first axial distance, being between 0.3 and 0.6.

2. The method of claim 1, wherein the rectifier assembly is within the rotor shaft.

3. The method as set forth in claim 1, wherein said shaft body is formed with a ledge spaced axially inwardly from said one end, and providing a stop for a clutch member to be received within said shaft body.

4. The method as set forth in claim 1, wherein a ratio of an axial length of said spline teeth to said distance from said one end to said remote axial end of said spline teeth being between 0.1 and 0.125.

5. The method as set forth in claim 1; wherein the ratio of the distance from said one axial end of said shaft body to said remote axial end of said spline teeth, to the first axial distance, being between 0.4 and 0.5.

6. The method as set forth in claim 1, wherein screw threads at said remote axial end of said shaft body receiving a permanent magnet rotor.

* * * * *